(12) United States Patent
Sugihara et al.

(10) Patent No.: US 8,662,740 B2
(45) Date of Patent: Mar. 4, 2014

(54) AGITATION APPARATUS

(75) Inventors: Atsushi Sugihara, Toyota (JP);
Masanori Kitayoshi, Toyota (JP);
Yasuyuki Nakane, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/389,642

(22) PCT Filed: Oct. 23, 2009

(86) PCT No.: PCT/JP2009/068282
§ 371 (c)(1),
(2), (4) Date: Feb. 9, 2012

(87) PCT Pub. No.: WO2011/048698
PCT Pub. Date: Apr. 28, 2011

(65) Prior Publication Data
US 2012/0195160 A1 Aug. 2, 2012

(51) Int. Cl.
*B01F 7/00* (2006.01)
(52) U.S. Cl.
USPC .................................................. 366/279
(58) Field of Classification Search
USPC ................. 366/342, 341, 241, 249, 242, 129
See application file for complete search history.

(56) References Cited

U.S. PATENT DOCUMENTS

| 372,043 | A | * | 10/1887 | Pusey | 366/342 |
| 1,726,125 | A | * | 8/1929 | Rowand | 366/164.3 |
| 3,362,338 | A | * | 1/1968 | Stethem | 416/183 |
| 4,339,205 | A | * | 7/1982 | Kato et al. | 366/296 |
| 7,229,206 | B2 | * | 6/2007 | Whitney | 366/129 |

FOREIGN PATENT DOCUMENTS

| JP | 3256801 | 12/2001 |
| JP | 2003-231789 | 8/2003 |
| JP | 2005-129482 | 5/2005 |
| JP | 2006-212489 | 8/2006 |
| JP | 2006-236658 | 9/2006 |
| JP | 2007-125454 | 5/2007 |
| JP | 2007-181815 | 7/2007 |

OTHER PUBLICATIONS

International Search Report in International Application No. PCT/JP2009/068282; Mailing Date: Feb. 9, 2010.

* cited by examiner

*Primary Examiner* — Tony G Soohoo
*Assistant Examiner* — Anshu Bhatia
(74) *Attorney, Agent, or Firm* — Finnegan, Henderson, Farabow, Garrett & Dunner, LLP (57) ABSTRACT

An agitation apparatus (100) has a rotation shaft (150) provided along the central axis of a cylindrically shaped agitation vessel (102). To the rotation shaft (150), a substantially cylindrically shaped agitation member (104) is attached. The agitation member (104) has an outer diameter smaller than the inner diameter of the agitation vessel (102), and rotates concentrically with the inner circumferential surface of the agitation vessel (102). The agitation member (104) has a plurality of through holes (162, 164) formed in radial directions therethrough. The through holes (164) formed in an upper portion of the agitation member (104) are larger than the through holes (162) formed in a lower portion of the agitation member (104).

8 Claims, 8 Drawing Sheets

AGITATION APPARATUS

CROSS-REFERENCE TO RELATED APPLICATIONS

This application is a national phase application of International Application No. PCT/JP2009/068282, filed Oct. 23, 2009, the contents of which are incorporated herein by reference.

TECHNICAL FIELD

The present invention relates to an agitation apparatus, and more particularly to an agitation apparatus usable for agitating and mixing, for example, electrode active materials, conductive agents, binder agents, and solvents.

BACKGROUND ART

An example of such an agitation apparatus has a cylindrically shaped agitation vessel, and a substantially cylindrically shaped agitation member that has an outer diameter smaller than the inner diameter of the agitation vessel and rotates concentrically with the inner circumferential surface of the agitation vessel. The agitation member has a multiplicity of small holes formed in radial directions through its cylindrical portion. In the agitation apparatus, the agitation member rotates at high speed while keeping a very small clearance from the inner circumferential surface of the agitation vessel. In association with the high-speed rotation of the agitation member, a centrifugal force acts on a material supplied to the agitation vessel. By the centrifugal force, the material is forced out in radially outward directions through the small holes formed in the agitation member, and is spread in a tubular thin film shape into a gap between the outer circumferential surface of the agitation member and the inner circumferential surface of the agitation vessel. At that time, the material is agitated between the surface of the material and the inner circumferential surface of the agitation vessel. Then, the material that has been agitated sufficiently to lower its viscosity is moved to the upper portion of the agitation vessel by the centrifugal force and is discharged from the upper portion of the agitation vessel.

This type of agitation apparatus is disclosed in, for example, JP 3256801 B (Patent Literature 1), JP 2005-129482 A (Patent Literature 2), JP 2006-236658 A (Patent Literature 3), and JP 2007-125454 A (Patent Literature 4).

CITATION LIST

Patent Literature

[Patent Literature 1] JP 3256801 B
[Patent Literature 2] JP 2005-129482 A
[Patent Literature 3] JP 2006-236658 A
[Patent Literature 4] JP 2007-125454 A

SUMMARY OF INVENTION

Technical Problem

The just-described agitation apparatus agitates a material by rotating the agitation member while the material is being supplied in the agitation vessel. In this case, the agitation apparatus generates heat because of the friction caused by the material that is agitated between the agitation vessel and the agitation member. Lithium-ion secondary batteries use electrode slurry prepared by mixing an electrode active material, a conductive agent, a binder agent, a solvent, and so forth at a predetermined proportion and thereafter agitating the agitation apparatus. When producing the electrode slurry, a mixture of an electrode active material, a conductive agent, a binder agent, a solvent, and so forth is agitated by the agitation apparatus. There are cases in which the just-mentioned mixture has a high viscosity at the initial stage of the supplying of the mixture to the agitation apparatus.

The present inventors have investigated to use the agitation apparatus having a cylindrically shaped agitation vessel and an agitation member rotating concentrically in the cylindrically shaped agitation vessel for the purpose of agitating the electrode slurry efficiently. However, when using the agitation apparatus to agitate a paste-like material with a high viscosity, a large friction occurs between the agitated material and the agitation vessel and between the agitated material and the agitation member, which may result in high-temperature heat. On the other hand, if it is attempted to reduce such heat generation, process efficiency will be decreased. The present inventors have desired to keep the generated heat low and at the same time improve the process efficiency in the process of agitating such a material.

According to knowledge of the present inventors, the process efficiency can be increased by making the holes formed in the agitation member larger so that the material can be supplied more easily to the gap between the agitation vessel and the agitation member. However, if the size of the holes formed in the agitation member is made larger, the generated heat tends to be higher because the material tends to be supplied more easily to the gap between agitation vessel and the agitation member. Conversely, if the size of the holes formed in the agitation member is made smaller, the generated heat can be kept low but the process efficiency will be decreased because the material tends to be supplied less easily to the gap between the agitation vessel and the agitation member. The present inventors propose a novel structure for such an agitation apparatus that can keep the generated heat low and at the same time increase the process efficiency.

Solution to Problem

According to the present invention, an agitation apparatus comprises: a cylindrically shaped agitation vessel; a rotation shaft provided along the central axis of the agitation vessel; a substantially cylindrically shaped agitation member having an outer diameter smaller than an inner diameter of the agitation vessel and attached to the rotation shaft so as to rotate concentrically with the inner circumferential surface of the agitation vessel; and a plurality of through holes formed in radial directions through the agitation member, wherein ones of the plurality of through holes formed in a lower portion of the agitation member are larger than other ones of the plurality of through holes formed in an upper portion of the agitation member.

In this agitation apparatus, ones of the plurality of through holes formed in the lower portion of the agitation member are larger than other ones of the plurality of through holes formed in the upper portion of the agitation member. Thus, a material with a high viscosity is processed in the lower portion of the agitation vessel at an early stage. Then, after the material is agitated to a certain degree and the viscosity is lowered, the material is processed in the upper portion of the agitation vessel. In this case, although the generated heat is relatively high in the lower portion of the agitation vessel, in which the material with a high viscosity is processed, the generated heat is kept low in the upper portion of the agitation vessel.

Thereby, the generated heat can be kept low in the agitation apparatus as a whole. Moreover, even when a material with a high viscosity is supplied thereto, the material can be supplied easily to the gap between the agitation vessel and the agitation member in the lower portion of the agitation vessel, and therefore, the process efficiency can be prevented from decreasing.

The agitation member may comprise, for example: a cylindrical portion having an outer diameter smaller than the inner diameter of the agitation vessel; an arm portion extending radially from a mid-portion of the axis of the cylindrical portion; and a boss portion disposed at the center of the arm portion and fitted to the rotation shaft. In this case, ones of the through holes formed below the mid-portion of the axis from which the arm portion extends may be larger than ones of the through holes formed above the mid-portion.

In addition, the ones of the through holes formed in the lower portion of the agitation member may be uniformly larger than the ones of the through holes formed in the upper portion thereof. The agitation member is not limited thereto, and the agitation member may have through holes formed therein so as to be gradually larger from the upper portion toward the lower portion. For example, the ones of the through holes formed in the upper portion of the agitation member may have a circular shape, and the ones of the through holes formed in the lower portion of the agitation member may have a square shape whose one side has the same length as the diameter of the ones of the through holes formed in the upper portion.

The through holes may penetrate through the agitation member along radial directions of the agitation member. The through holes may penetrate through the agitation member so as to be inclined with respect to radial directions of the agitation member. The through holes may penetrate through the agitation member so as to be inclined forward of a rotation direction of the agitation member, from inside of the agitation member to outside thereof.

DESCRIPTION OF EMBODIMENTS

Hereinbelow, an agitation apparatus according to one embodiment of the present invention will be described with reference to the drawings. It should be noted that the present invention is not limited to the following embodiments. The members and components that exhibit the same effects are denoted by the same reference symbols.

Figure 1:
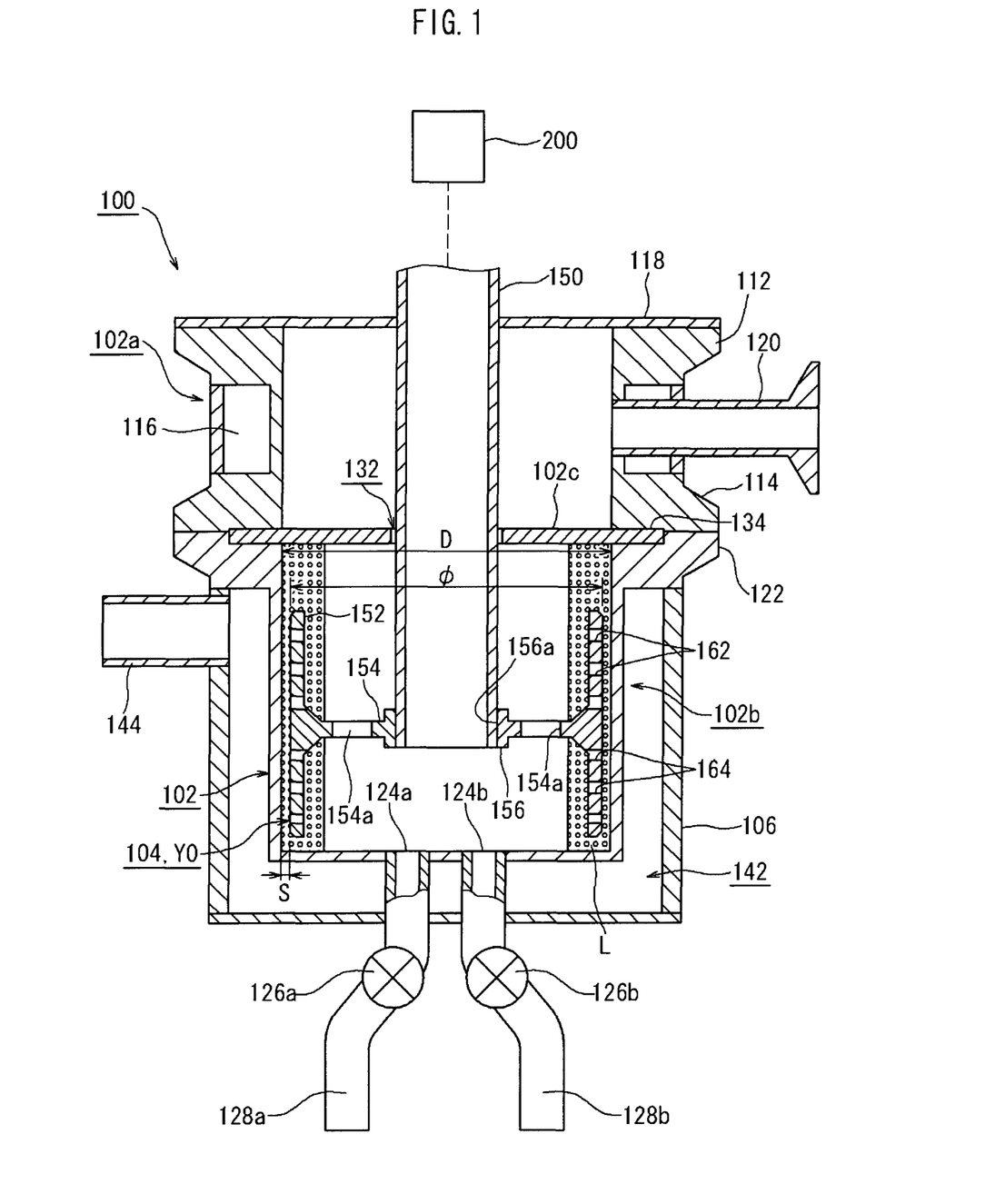
FIG. 1 is a cross-sectional view illustrating an agitation apparatus according to one embodiment of the present invention.

FIG. 1 is a vertical cross-sectional view illustrating an agitation apparatus 100. As illustrated in FIG. 1, the agitation apparatus 100 has an agitation vessel 102, an agitation member 104, and an outer vessel 106. In the present embodiment, the agitation vessel 102 is a container having a cylindrically shaped inner circumferential surface, which has an upper case 102a, a lower case 102b, and a weir plate 102c.

The upper case 102a is a substantially cylindrically shaped container. The upper case 102a has flanges 112 and 114 extending radially outward, provided at the upper and lower end portions of the upper case 102a. A coolant chamber 116 to which coolant is supplied is formed in an outer peripheral portion of the upper case 102a. A lid 118 is provided on the upper end face of the upper case 102a. The cylindrical portion of the upper case 102a is provided with a discharge port 120 for a material L.

The lower case 102b is a closed-end cylindrical container having an inner circumferential surface having substantially the same inner diameter as that of the upper case 102a. It has a flange 122 extending radially outward provided at its upper portion. The bottom portion of the lower case 102b is provided with supply ports 124a and 124b for the material L at its lower portion. In this embodiment, the bottom portion of the lower case 102b is provided with a plurality of (two in the example shown in the figure) supply ports 124a and 124b, and supply pipes 128a and 128b having respective supply valves 126a and 126b are fitted to the supply ports 124a and 124b.

The upper case 102a and the lower case 102b are stacked vertically so that their internal spaces communicate with each other concentrically. The weir plate 102c is fitted between the upper case 102a and the lower case 102b. The weir plate 102c is a disk-shaped member having a hole 132 at its center portion. In this embodiment, a recess 134 for fitting the weir plate 102c is formed in the upper end face of the lower case 102b. The weir plate 102c is sandwiched between the upper case 102a and the lower case 102b while it is fitted in the recess 134 formed in the upper end face of the lower case 102b.

The outer vessel 106 is a container that covers the bottom portion and the outer circumferential surface of the lower case 102b of the agitation vessel 102. A coolant chamber 142 to which coolant is supplied is formed between the lower case 102b and the outer vessel 106. A coolant supply pipe 144 for supplying the coolant to the coolant chamber 142 is connected to the outer vessel 106. The agitation vessel 102 is provided with a rotation shaft 150 to which the agitation member 104 is fitted. As illustrated in FIG. 1, the rotation shaft 150 penetrates through the lid 118 of the agitation vessel 102, and extends along the central axis of the agitation vessel 102 through the hole 132 formed at the center of the weir plate 102c. The rotation shaft 150 extends outside from a top portion of the agitation vessel 102. The rotation shaft 150 is connected to a driving apparatus 200 provided external to the agitation vessel 102.

The agitation member 104 is a substantially cylindrically shaped member. The outer diameter φ of the agitation member 104 is, as shown in FIG. 1, slightly smaller than the inner diameter D of the agitation vessel 102. The agitation member 104 is fitted to the rotation shaft 150 so as to rotate concentrically with the inner circumferential surface of the agitation vessel 102. The agitation member 104 has a plurality of through holes 162 and 164 formed therein. In the agitation apparatus 100, the through holes 164 formed in the lower portion of the agitation member 104 are larger than the through holes 162 formed in the upper portion of the agitation member 104.

As illustrated in FIG. 1, the material L is supplied to the agitation apparatus 100 through the supply ports 124a and 124b, which are provided in the bottom portion of the lower case 102b of the agitation vessel 102. The material L supplied to the agitation vessel 102 is urged and rotated in a circumferential direction by the high-speed rotation of the agitation member 104. At that time, by the centrifugal force acting on the material L, the material L is supplied to the gap between the agitation vessel 102 and the agitation member 104 through the through holes 162 and 164 formed in the agitation member 104. At that time, the material L that has flowed and entered the through holes 162 and 164 receives a strong force from the inner surfaces of the through holes 162 and 164, and flows out from the through holes 162 and 164 into a gap S between the agitation vessel 102 and the agitation member 104 by the centrifugal force.

As a result, the pressure of the material L in the gap S increases. In addition, the outflow of the material L from the through holes 162 and 164 into the gap S between the agitation vessel 102 and the agitation member 104 disturbs the flow of the material L in the gap S. Thereby, a desired agitation effect can be obtained. Further, the material L rotates while it is being in intimate contact with the inner surface of the agitation vessel 102, in a hollow cylindrical thin film shape. At that time, because of the speed difference between the surface of the agitation member 104 and the inner surface of the agitation vessel 102, the material L receives a shearing force in a circumferential direction of the agitation vessel 102, and is agitated. In addition, the components contained in the material L are turned into fine particles.

To the agitation apparatus 100, the material L is continuously supplied through the supply ports 124a and 124b, which are provided in the bottom portion of the lower case 102b of the agitation vessel 102. As the agitation proceeds within the agitation vessel 102 as described above, the viscosity of the material L decreases, and the material L moves upward due to the centrifugal force. As the agitation proceeds further, the material L gradually moves toward the upper portion in the agitation vessel 102, moves beyond the weir plate 102c between the upper case 102a and the lower case 102b, and flows out into the upper case 102a. The material L that has flowed into the upper case 102a is then discharged from the discharge port 120 provided for the upper case 102a.

Figure 2:
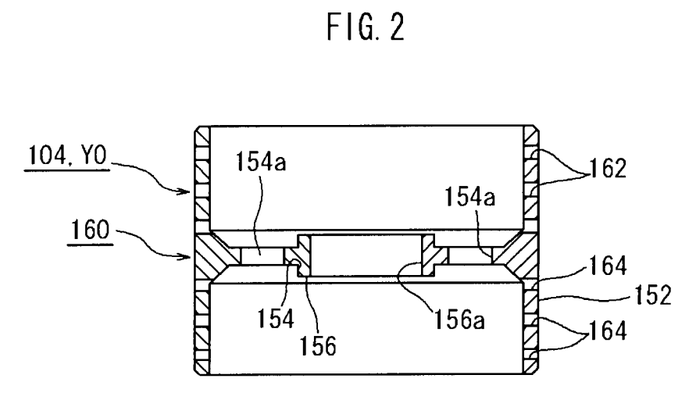
FIG. 2 is a cross-sectional view illustrating an agitation member of the agitation apparatus according to one embodiment of the present invention.
Figure 3:
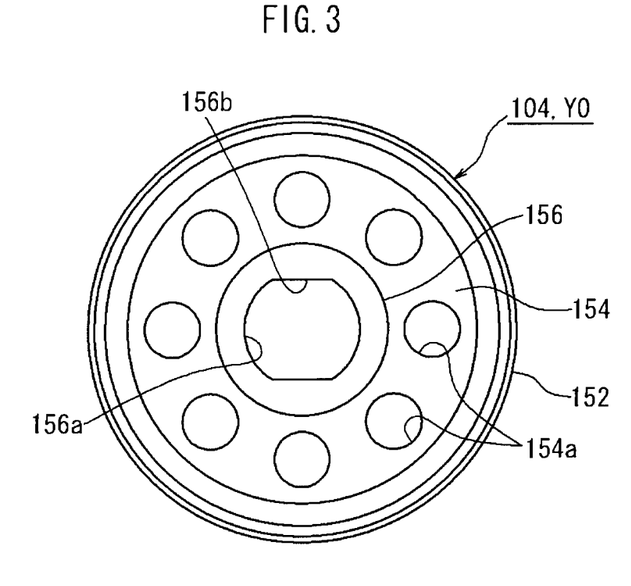
FIG. 3 is a plan view illustrating the agitation member of the agitation apparatus according to one embodiment of the present invention.
Figure 4:
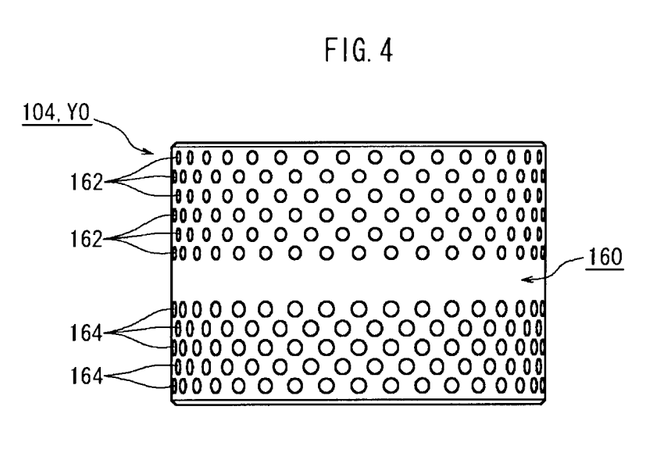
FIG. 4 is a front view illustrating an agitation member of the agitation apparatus according to one embodiment of the present invention.

Hereinbelow, the agitation member 104 in this embodiment will be described in detail. FIG. 2 shows a vertical cross-sectional view of the agitation member 104, FIG. 3 shows a plan view of the agitation member 104, and FIG. 4 shows a front view of the agitation member 104. In this embodiment, as illustrated in FIGS. 2 and 3, the agitation member 104 has a cylindrical portion 152, an arm portion 154, and a boss portion 156.

As shown in FIG. 1, the cylindrical portion 152 is a substantially cylindrically shaped portion having a smaller outer diameter φ than the inner diameter of the agitation vessel 102. In this embodiment, the outer diameter φ of the cylindrical portion 152 is, as shown in FIG. 1, slightly smaller than the lower case 102b of the agitation vessel 102. The arm portion 154 extends radially from an axially mid-portion of the cylindrical portion 152. The boss portion 156 is provided at the center of the arm portion 154, and it is a portion to which the rotation shaft 150 is fitted.

In this embodiment, as illustrated in FIG. 2, the arm portion 154 extends radially inward from an axially mid-portion of the cylindrical portion 152. As illustrated in FIG. 3, the arm portion 154 is formed continuously along a circumferential direction, and a plurality of (eight in the example shown in the figure) holes 154a vertically penetrating the arm portion 154 are formed therein along a circumferential direction at a predetermined interval. As illustrated in FIGS. 2 and 3, the boss portion 156 is provided at the center of the arm portion 154 (i.e., the center of the cylindrical portion 152). As illustrated in FIGS. 1 and 2, the boss portion 156 has a fitting hole 156a formed therein, for fitting the rotation shaft 150. It is recommend that the fitting hole 156a have a structure for transmitting rotation of the rotation shaft 150 reliably (such as a working face in a circumferential direction, a key structure, and a spline). In this embodiment, the fitting hole 156a has an abutting surface 156b, and although not shown in the drawings, the rotation shaft 150 also has a surface abutting to the abutting surface 156b.

The cylindrical portion of the agitation member 104 has the plurality of through holes 162 and 164 formed therein. The through holes 164 formed in the lower portion of the agitation member 104 are larger than the through holes 162 formed in the upper portion of the agitation member 104. In this embodiment, in the agitation member 104, the through holes 164 larger than those in the upper portion are formed in the lower portion below the boundary of the axially mid-portion 160 of the cylindrical portion 152 from which the arm portion 154 extends.

The through holes 162 and 164 may be set to have appropriate sizes taking into consideration the viscosity and particle size of the material L supplied to the agitation vessel 102 at the initial stage. In this embodiment, the through holes 164 formed in the lower portion of the agitation member 104 are set at a size such that even the material L in the initial supply stage with a high viscosity can pass therethrough. On the other hand, the through holes 162 formed in the upper portion are set at a size such that the material L in the initial supply stage with a high viscosity cannot easily pass therethrough but the material L that has been agitated to a certain degree and whose viscosity has been lowered can pass therethrough.

In this embodiment, each of the plurality of through holes 162 formed in the upper portion of the agitation vessel 102 is formed to be the same size. Likewise, each of the plurality of through holes 164 formed in the lower portion of the agitation member 104 is formed to be the same size. Specifically, in this embodiment, each of the plurality of through holes 162 formed in the upper portion of the agitation member 104 is a circular hole having a diameter of 3 mm. Each of the plurality of through holes 164 formed in the lower portion of the agitation member 104 is a circular shaped hole having a diameter of 5 mm. Thus, in this embodiment, the through holes 162 formed in the upper portion of the agitation member 104 are made uniformly smaller than the through holes 164 formed in the lower portion of the agitation member 104.

In the agitation apparatus 100, the through holes 164 formed in the lower portion of the agitation member 104 are circular shaped holes having a diameter of 5 mm. In this embodiment, the through holes 164 formed in the lower portion are set at a size such that the material L in the initial supply stage with a high viscosity can pass therethrough. As a result, the material L in the initial supply stage with a high viscosity can be processed in the lower portion of the agitation vessel 102. On the other hand, the material L that has been agitated to a certain degree and whose viscosity has been lowered receives the centrifugal force and moves toward the upper portion of the agitation member 104. In this way, the material L is agitated to a certain degree in the lower portion of the agitation vessel 102. Therefore, the material L with a viscosity that has been lowered from that in the initial supply stage tends to be supplied to the upper portion of the agitation member 104.

The through holes 162 formed in the upper portion of the agitation member 104 are circular shaped holes having a diameter of 3 mm. The through holes 162 formed in the upper portion are set at a size such that the material L in the initial supply stage with a high viscosity cannot easily pass therethrough but the material L that has been agitated to a certain degree and whose viscosity has been lowered can pass therethrough. The material L whose viscosity has been lowered than that in the initial supply stage passes through the through holes 162 formed in the upper portion of the agitation member 104, and is supplied to the gap between the agitation vessel 102 and the agitation member 104. Thus, the material L having a high viscosity in the initial supply stage is processed in the lower portion of the agitation member 104. On the other hand, the material L that has been agitated to a certain degree and whose viscosity has been lowered is processed in the upper portion of the agitation member 104.

In this case, although the generated heat of the material L is great in an adjacent region to the lower portion of the agitation member 104, in which the material L with a high viscosity is processed, the generated heat of the material L is kept low in an adjacent region to the upper portion of the agitation member 104, in which the material L whose viscosity has been lowered is processed. As a result, the generated heat of the material L can be kept low in the agitation apparatus as a whole. Moreover, in the lower portion of the agitation vessel 102, the through holes 164 are made larger so that the material L can be supplied easily to the gap between the agitation vessel 102 and the agitation member to 104. Therefore, even when the material L with a high viscosity is supplied thereto, the process efficiency can be prevented from decreasing. Thus, the agitation apparatus 100 can keep the generated heat low as a whole and at the same time prevent the process efficiency from decreasing.

Figure 5:
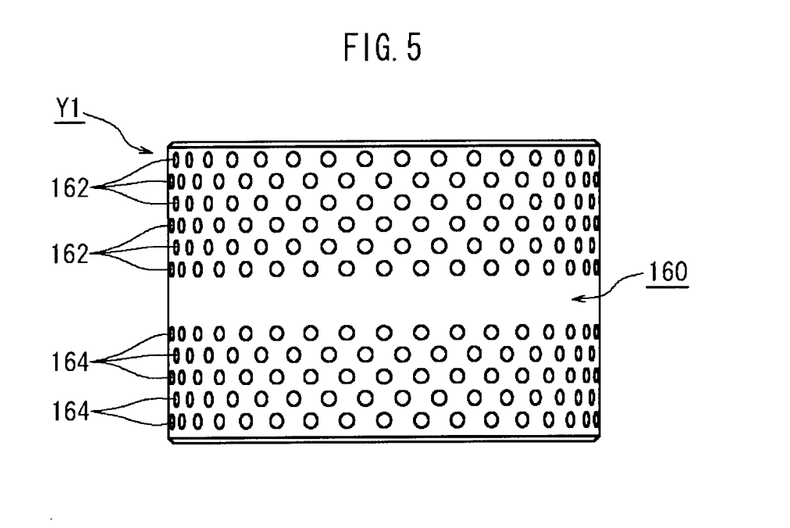
FIG. 5 is a front view illustrating an agitation member used in the test.
Figure 6:
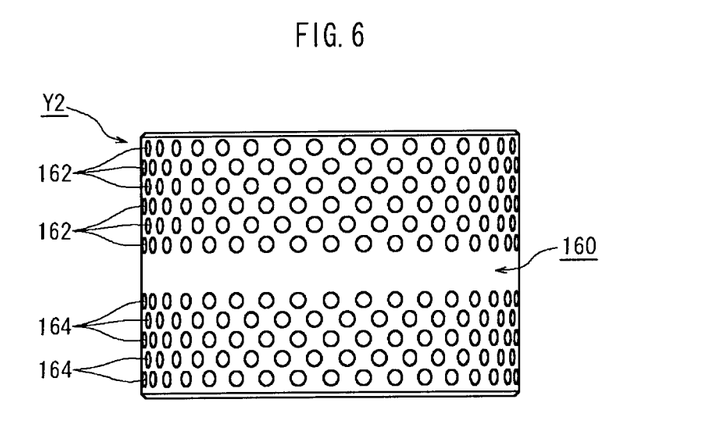
FIG. 6 is a front view illustrating an agitation member used in the test.

The present inventors prepared a plurality of agitation members having different through holes for such an agitation apparatus 100, and processed the same material L by an agitation process under the same conditions, to measure the viscosity of the material L and the temperature increase of the material L after the process. In one example, the present inventors prepared an agitation member Y0 as shown in FIG. 4, in which circular shaped through holes 162 having a diameter of 3 mm were formed in the upper portion and circular shaped through holes 164 having a diameter of 5 mm were formed in the lower portion. For purposes of comparison with this example, the inventors also prepared an agitation member Y1 as shown in FIG. 5, in which all the through holes 162 and 164 were formed to be circular shaped through holes having a diameter of 3 mm, and an agitation member Y2 as shown in FIG. 6, in which all the through holes 162 and 164 were formed to be circular shaped through holes having a diameter of 5 mm. The inventors also prepared a material L in which its components were weighed to adjust the contents and were mixed appropriately.

Figure 7:
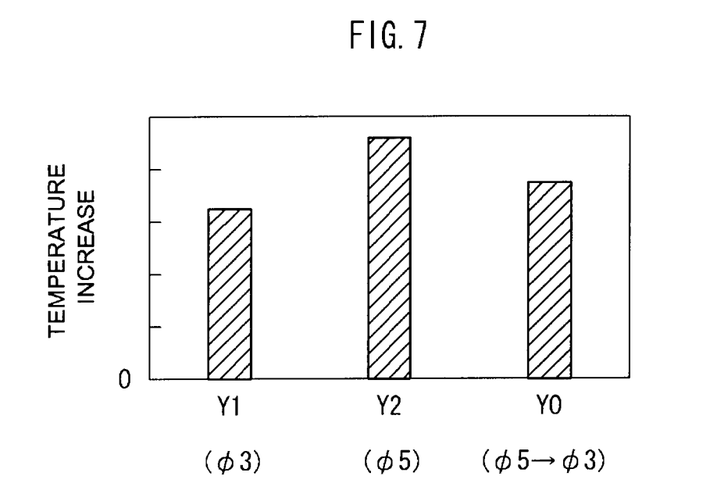
FIG. 7 is a graph illustrating the test results showing the temperatures of materials.

Next, the material L was supplied at a predetermined amount to three agitation vessels 102 to which the agitation members Y0, Y1, and Y2 were fitted respectively, and an agitation process was carried out by rotating the agitation members Y0, Y1, and Y2 at a peripheral speed of 40 m/s for 120 seconds. Then, immediately after that process, the temperature of the material L was measured for each sample. As a result, as shown in FIG. 7, the temperature increase of the material L was about 65° C. for the agitation member Y1, in which all the through holes 162 and 164 were formed in a circular shape having a diameter of 3 mm. The temperature increase of the material L was about 90° C. for the agitation member Y2, in which all the through holes 162 and 164 were formed in a circular shape having a diameter of 5 mm. In contrast, the temperature increase of the material L was about 70° C. for the agitation member Y0, in which the circular shaped through holes 162 having a diameter of 3 mm are formed in the upper portion and the circular shaped through holes 164 having a diameter of 5 mm are formed in the lower portion. This demonstrates that when the agitation member Y0 was used, a great temperature increase did not occur in comparison with the agitation member Y2, in which all the through holes 162 and 164 were formed in a circular shape having a diameter of 5 mm. Thus, the temperature increase of the material L can be kept low.

In addition, as for the efficiency of the agitation process, the present inventors made a comparison between the agitation member Y0, in which the circular shaped through holes 162 having a diameter of 3 mm were formed in the upper portion and the circular shaped through holes 164 having a diameter of 5 mm were formed in the lower portion, and the agitation member Y1, in which all the through holes 162 and 164 were formed in a circular shape having a diameter of 3 mm. Each example was processed at 40 m/s for 120 seconds. Then, each example was set aside until the temperature of the material L became 25° C., and thereafter, the viscosity of the material L was measured. The viscosity measurement was conducted using an E-type viscometer (R550 made by Toki Sangyo Co., Ltd.). Here, the cone of the viscometer was rotated at 1 rpm, 20 rpm, and 100 rpm, and the viscosity for each case was measured. The test results are shown in FIG. 8.

Figure 8:
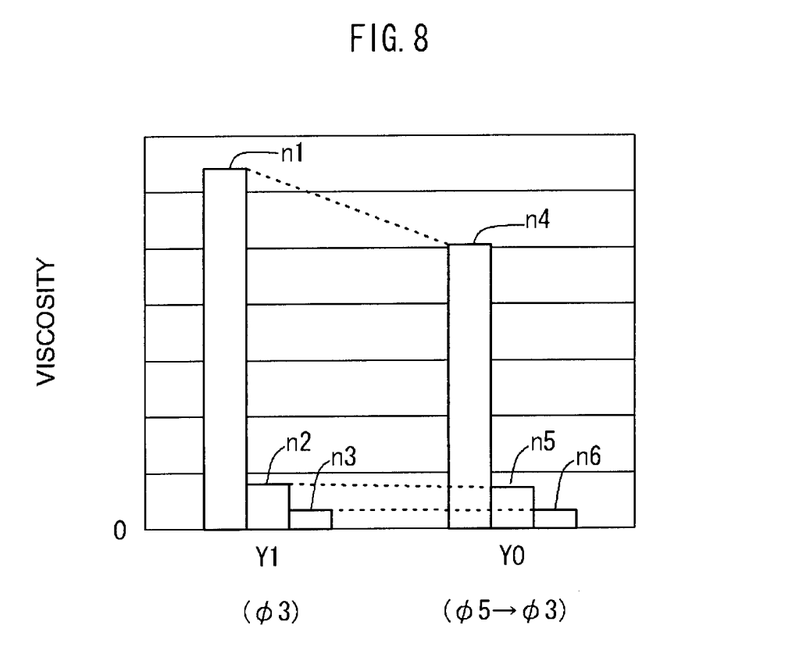
FIG. 8 is a graph illustrating the test results showing the viscosities of materials.

As a result, as shown in FIG. 8, when the cone of the viscometer was rotated at 1 rpm in the measurement, the viscosity n4 of the material L having been subjected to the agitation process using the agitation member Y0 was about 0.79, assuming that the viscosity n1 of the material L after subjected to the agitation process using the agitation member Y1 was 1.

When the cone of the viscometer was rotated at 20 rpm in the measurement, the viscosity n5 of the material L having been subjected to the agitation process using the agitation member Y0 was about 0.90, assuming that the viscosity n2 of the material L having been subjected to the agitation process using the agitation member Y1 was 1.

When the cone of the viscometer was rotated at 100 rpm in the measurement, the viscosity n6 of the material L having been subjected to the agitation process using the agitation member Y0 was about 0.93, assuming that the viscosity n3 of the material L having been subjected to the agitation process using the agitation member Y1 was 1.

In the comparative test, the material L used as the sample was a mixture in which a positive electrode active material (such as a lithium-containing oxide), carbon as a conductive agent, and a binder were mixed in a solvent at a predetermined ratio. It should be noted that when the components in the material L and the ratio of the mixture are varied, the viscosity of the material L in the initial supply stage and the viscosity the material L having been subjected to the agitation process viscosity also change. In addition, the temperature of the material L increases due to the agitation process, irrespective of the components of the material L and the content ratio thereof. Although the data will change when the components of the material L and the content ratio thereof are varied, the tendency observed in the comparison of the data between the above-described cases in which the agitation members Y0, Y1, and Y2 are used tends to be almost unvaried.

Thus, the agitation apparatus 100 according to one embodiment of the present invention uses the agitation member Y0, in which the through holes 164 formed in the lower portion are larger than the through holes 162 formed in the upper portion. The agitation apparatus 100 makes it possible to keep the generated heat low in the agitation apparatus 100 as a whole and at the same time to improve the process efficiency. The agitation apparatus is suitable as an apparatus for agitating a material having a high viscosity, such as electrode slurry for lithium-ion secondary batteries.

Hereinabove, an agitation apparatus 100 according to one embodiment of the present invention has been described, but the agitation apparatus according to the invention is not limited by the foregoing embodiment.

In the foregoing embodiment, as illustrated in FIGS. 2 and 4, the agitation member 104 has a boundary at the axially mid-portion 160 from which the arm portion 154 extends, and the through holes 164 formed in the lower portion below the boundary are larger than the through holes 162 formed in the upper portion. The boundary between the through holes 162 and 164 formed in the agitation member 104 need not be set at the axially mid-portion 160 from which the arm portion 154 extends.

In addition, in the foregoing embodiment, the through holes 164 formed in the lower portion of the agitation member 104 are uniformly larger than the through holes to 162 formed in the upper portion of the agitation member 104. The sizes of the through holes 162 and 164 formed in the agitation member 104 are not limited to such a configuration. For example, as in an agitation member 104A shown in FIG. 9, through holes 166a-166d being gradually larger from the upper portion to the lower portion of the agitation member 104A may be formed.

Figure 9:
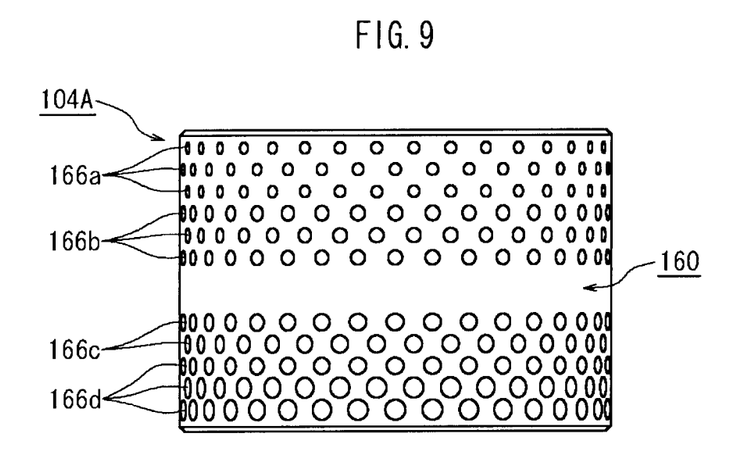
FIG. 9 is a front view illustrating the agitation member of an agitation apparatus according to another embodiment of the present invention.

For example, in the example shown in FIG. 9, 11 rows of the through holes 166a-166d are formed so as to be aligned vertically from the upper portion toward the lower portion of the agitation member 104A. The smallest through holes 166a are formed from the topmost row to the third row from the top. The through holes 166b that are slightly larger than the through holes 166a formed down to the third row are formed from the fourth row to the sixth row from the top. The through holes 166c that are larger than the through holes 166b formed from the fourth row to the sixth row are formed from the seventh row to the ninth row from the top. The largest through holes 166d are formed in the tenth row and the eleventh row. Thus, the through holes 166a to 166d being gradually larger from the upper portion to the lower portion of the agitation member 104 A are formed in the agitation member 104A shown in FIG. 9.

In this embodiment, the through holes 166d formed in the lower portion of the agitation member 104A are set at a size such that the material L in the initial supply stage with a high viscosity can be supplied to the gap between the agitation vessel 102 and the agitation member 104A. In addition, the through holes 166d, the through holes 166c, the through holes 166b, and the through holes 166a become smaller toward the upper portion of the agitation member 104A. Therefore, the material L in the initial supply stage with a high viscosity is more difficult to be supplied to the gap S between the agitation vessel 102 and the agitation member 104A as it moves further toward the upper portion of the agitation member 104A. In addition, the viscosity of the material L supplied to the gap between the agitation vessel 102 and the agitation member 104A gradually becomes lower and lower toward the top of the agitation member 104A.

When using the agitation member 104A, the level of the agitation of the material L can be adjusted more finely from the lower portion to the upper portion in the agitation vessel 102. This allows the agitation of the material L to be more reliably. Moreover, in this case as well, the generated heat produced in the agitation vessel 102 can be kept low and at the same time the process efficiency of the agitation apparatus 100 can be improved by setting the sizes of the through holes 166a-166d appropriately.

It should be noted that in the agitation member 104A shown in FIG. 9, the sizes of the 11 rows of the through holes 166a-166d are set to be in the respective four sizes from the upper portion toward the lower portion of the agitation member 104A, but the agitation member 104A is not limited to having such a configuration. For example, a plurality of rows of the through holes in the agitation member 104A may be gradually made larger row by row from the upper portion toward the lower portion.

In another embodiment, although the through holes formed in the agitation member have a circular shape in the foregoing embodiment, the shape of the through holes need not be a circular shape. For example, the through holes may have various geometric shapes including: quadrangular shapes, such as square, parallelogram, rectangle, and trapezoid; triangular shapes; other polygonal shapes; and elliptic shapes, or they may even have irregular shapes.

Figure 10:
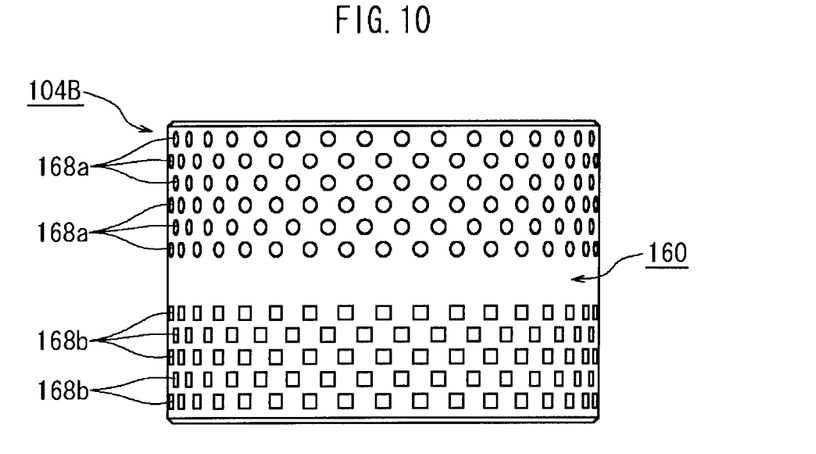
FIG. 10 is a front view illustrating the agitation member of an agitation apparatus according to yet another embodiment of the present invention.

For example, in an agitation member 104B shown in FIG. 10, the through holes 168a formed in the upper portion have a circular shape, while the through holes 168b formed in the lower portion have a square shape whose one side has the same length as the diameter of the through holes 168a formed in the upper portion. In this case, the through holes 168b formed in the lower portion can be made larger to an appropriate degree than the through holes 168a formed in the upper portion.

Figure 11:
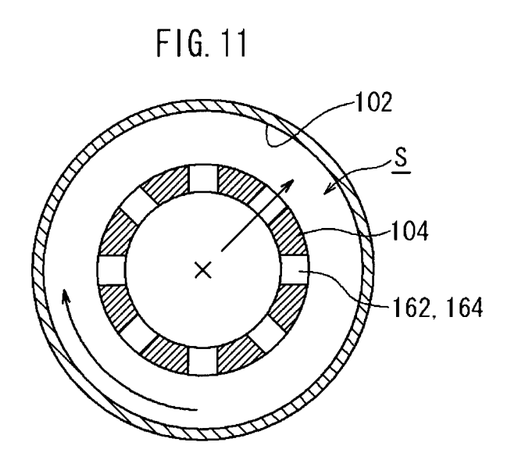
FIG. 11 is a cross-sectional view illustrating a modified example regarding through holes formed in the agitation member.

In the embodiment shown in FIG. 1, for example, the through holes 162 and 164 formed in the agitation member 104 penetrate through the agitation member 104 along radial directions of the agitation member 104, as schematically illustrated in FIG. 11. In this case, when the viscosity of the material L is high, the material L may clog the through holes 162 and 164, resulting in a decrease in process efficiency. In the present invention, the through holes formed in the agitation member 104 are not limited to having the configuration in which the through holes penetrate therethrough along radial directions.

Figure 12:
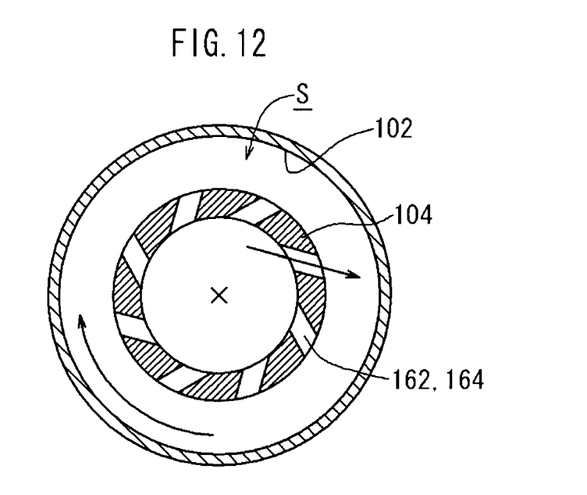
FIG. 12 is a cross-sectional view illustrating a modified example regarding through holes formed in the agitation member.

For example, as illustrated in FIG. 12, the through holes 162 and 164 may penetrate the agitation member 104 so as to be inclined with respect to radial directions of the agitation member 104. In this case, it is possible to adjust the directions and the flow strength of the material L that flows out from the through holes 162 and 164 toward the gap S between the agitation vessel 102 and the agitation member 104 because of the centrifugal force. For example, as illustrated in FIG. 12, the through holes 162 and 164 may be formed so as to be inclined forward of the rotation direction of the agitation member 104, from inside of the agitation member 104 to outside thereof.

In this case, it is expected that the flow strength of the material L flowing out from the through holes 162 and 164 toward the gap S between the agitation vessel 102 and the agitation member 104 becomes stronger by the centrifugal force, making it possible to improve the process efficiency. Moreover, since the flow strength of the material L can change depending on the inclination angle of the through holes 162 and 164, it is desirable that the angle at which the through holes 162 and 164 are inclined be set at an appropriate angle. In the example shown in FIG. 12, the through holes 162 and 164 are inclined at an angle of 45 degrees forward of the rotation direction of the agitation member 104, from the inner portion of the agitation member 104 toward the outer portion thereof.

When the through holes 162 and 164 are formed so as to be inclined with respect to radial directions of the agitation member 104, the configuration of the through holes is not limited to the one in which the through holes are inclined forward of the rotation direction of the agitation member 104 from inside of the agitation member to outside of the agitation member 104. In this case, the directions and the flow strength of the material L flowing out from the through holes 162 and 164 can be adjusted by the centrifugal force associated with the inclination direction and angle of the through holes 162 and 164 with respect to radial directions of the agitation member 104. The inclination direction of the through holes 162 and 164 with respect to radial directions of the agitation member 104 may be determined taking into consideration how the direction and flow strength of the material L flowing out from the through holes 162 and 164 should be adjusted by the centrifugal force.

For example, when it is desired to lower the flow strength of the material L flowing out from the through holes 162 and 164 by the centrifugal force, the through holes 162 and 164 should be inclined backward of the rotation direction of the agitation member 104 from the inner portion of the agitation member 104 toward the outer portion thereof. On the other hand, when it is desired to direct the material L flowing out from the through holes 162 and 164 downward by the centrifugal force, the through holes 162 and 164 should be inclined downward of the agitation member 104 from the inner portion of the agitation member 104 toward the outer portion thereof. By directing the material L flowing out from the through holes 162 and 164 downward, the material L can be circulated vertically within the agitation vessel 102, for example, so that the material L can be agitated more sufficiently.

Likewise, when it is desired to direct the material L flowing out from the through holes 162 and 164 upward by the centrifugal force, the through holes 162 and 164 should be inclined upward of the agitation member 104 from the inner portion of the agitation member 104 toward the outer portion thereof. By directing the material L flowing out from the through holes 162 and 164 upward, the material L can be agitated while the material is being sent upward within the agitation vessel 102, for example, so that the process speed for the material L can be increased.

Moreover, when the through holes 162 and 164 are formed so as to be inclined with respect to radial directions of the agitation member 104, it is possible to appropriately combine the inclination with respect to the rotation direction of the agitation member 104 and the inclination with respect to a vertical direction of the agitation member 104. Furthermore, when the through holes 162 and 164 are formed so as to be inclined with respect to radial directions of the agitation member 104, it is possible to change the inclination direction of the through holes partially.

For example, the through holes 164 formed in the lower portion of the agitation member 104 may be inclined forward of the rotation direction of the agitation member 104 from the inner portion of the agitation member 104 toward the outer portion thereof. Meanwhile, the through holes 164 formed in the upper portion of the agitation member 104 may be inclined upward of the agitation member 104 from the inner portion of the agitation member 104 toward the outer portion thereof. It is possible to change the inclination of the through holes 162 and 164 partially in this way.

Figure 13:
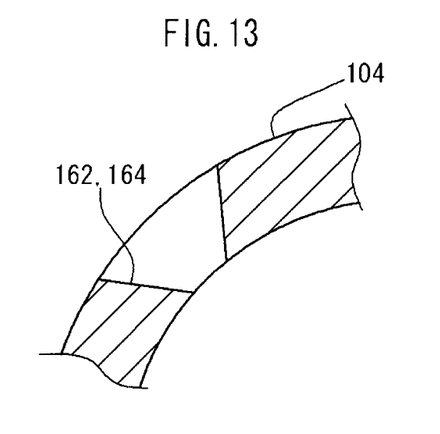
FIG. 13 is a cross-sectional view illustrating a modified example regarding through holes formed in the agitation member.

In addition, as illustrated in FIG. 13, the through holes of the agitation member 104 may be formed so as to be wider from the inner portion of the agitation member toward the outer portion thereof. On the other hand, although not shown in the drawings, the through holes of the agitation member 104 may be formed so as to be narrower from the inner portion of the agitation member toward the outer portion thereof. Such shapes of the through holes 162 and 164 may be combined as appropriate with the inclination thereof with respect to radial directions of the agitation member 104.

Various modified examples of the agitation apparatus 100, particularly those of the agitation member 104, have been illustrated hereinabove. However, the structures of the agitation apparatus 100 and the agitation member 104 are not limited to any of the foregoing embodiments. Moreover, the shapes and structures of the components and parts of the agitation apparatus 100 may be changed in various ways. This agitation apparatus is suitable for an apparatus for agitating a material having a high viscosity, such as electrode slurry for lithium-ion secondary batteries. The agitation apparatus according to the present invention may be used, not only in uses for agitating electrode slurry for lithium-ion secondary batteries, but in various uses for agitating a material having a high viscosity.

REFERENCE SIGNS LIST

100—Agitation apparatus
102—Agitation vessel
102a—Upper case
102b—Lower case
102c—Weir plate
104, 104A, 104B—Agitation member
106—Outer vessel
112, 114—Flange
116—Coolant chamber
118—Lid
120—Discharge port
122—Flange
124a, 124b—Supply port
126a, 126b—Supply valve
128a, 128b—Supply pipe
132—Hole
134—Recess
142—Coolant chamber
144—Coolant supply pipe
150—Rotation shaft
152—Cylindrical portion
154—Arm portion
154a—Hole
156—Boss portion
156a—Fitting hole
160—Mid portion 162—Through holes
164—Through holes
166a-166d—Through holes
168a, 168b—Through holes
200—Driving apparatus
L—Material
S—Gap between agitation vessel and agitation member
D—Inner diameter of agitation vessel
φ—Outer diameter of agitation member

The invention claimed is:

1. An agitation apparatus comprising:
a cylindrically shaped agitation vessel;
a rotation shaft provided along the central axis of the agitation vessel;
a substantially cylindrically shaped agitation member having an outer diameter smaller than an inner diameter of the agitation vessel and attached to the rotation shaft so as to rotate concentrically with the inner circumferential surface of the agitation vessel; and
a plurality of through holes through which a material supplied to the agitation vessel is able to flow, wherein
the plurality of through holes are formed in a cylindrical side wall part of the agitation member in radial directions through the agitation member but not formed in a top surface and a bottom surface of the agitation member, wherein
ones of the plurality of through holes formed in a lower cylindrical side wall portion of the agitation member are larger than other ones of the plurality of through holes formed in an upper cylindrical side wall portion of the agitation member.

2. The agitation apparatus according to claim 1, wherein:
the cylindrical side wall part of the agitation member has an outer diameter smaller than the inner diameter of the agitation vessel;
the agitation member comprises
an arm portion extending radially from an axially mid-portion of the cylindrical side wall part, and
a boss portion disposed at the center of the arm portion and fitted to the rotation shaft; and
ones of the through holes formed below the mid-portion of the axis from which the arm portion extends are larger than ones of the through holes formed above the mid-portion.

3. The agitation apparatus according to claim 1, wherein the ones of the through holes formed in the lower cylindrical side wall portion of the agitation member are uniformly larger than the ones of the through holes formed in the upper cylindrical side wall portion thereof.

4. The agitation apparatus according to claim 1, wherein the agitation member has through holes formed therein so as to be gradually larger from the upper cylindrical side wall portion toward the lower cylindrical side wall portion.

5. The agitation apparatus according to claim 1, wherein the ones of the through holes formed in the upper cylindrical side wall portion of the agitation member have a circular shape, and the ones of the through holes formed in the lower cylindrical side wall portion of the agitation member has a square shape whose one side has the same length as the diameter of the ones of the through holes formed in the upper cylindrical side wall portion.

6. The agitation apparatus according to claim 1, wherein the through holes penetrate radially through the agitation member.

7. The agitation apparatus according to claim 1, wherein the through holes penetrate through the agitation member so as to be inclined with respect to radial directions of the agitation member.

8. The agitation apparatus according to claim 1, wherein the through holes penetrate through the agitation member so as to be inclined forward of a rotation direction of the agitation member, from inside of the agitation member to outside thereof.

* * * * *